United States Patent [19]

Harned

[11] 3,821,392

[45] June 28, 1974

[54] METHOD OF ADMINISTERING CYCLOSERINE

[75] Inventor: Roger L. Harned, Terre Haute, Ind.

[73] Assignee: Commercial Solvents Corporation, Terre Haute, Ind.

[22] Filed: Mar. 19, 1973

[21] Appl. No.: 342,664

[52] U.S. Cl. .............................................. 424/272
[51] Int. Cl. ........................................... A61k 27/00
[58] Field of Search .................................... 424/272

[56] References Cited
UNITED STATES PATENTS
3,131,707   5/1964   Cordis ................................. 119/78
3,217,694   11/1965  Martin ................................. 119/79

OTHER PUBLICATIONS

Jonsson et al., Chem. Abst., Vol. 70, (1969), page 71,032t.

Kondrat'eva et al., Chem. Abst., Vol. 75, (1971), page 9,914g.

*Primary Examiner*—Sam Rosen
*Attorney, Agent, or Firm*—Robert H. Dewey; Howard E. Post

[57]     ABSTRACT

A method of administering cycloserine to an animal for prophylactic or therapeutic purposes by metering a concentrated alkaline solution of cycloserine into the drinking water provided for the animal in an amount sufficient to provide an effective dosage.

3 Claims, No Drawings

METHOD OF ADMINISTERING CYCLOSERINE

BACKGROUND OF THE INVENTION

This invention relates to a method of administering cycloserine to animals. In a particular aspect this invention relates to a method of administering cycloserine to animals in their drinking water.

Cycloserine is a well-known and valuable antibiotic. It can be administered either orally or parenterally. Cycloserine has been barred from many potentially useful applications because in the presence of moisture it readily and irreversibly forms a dimer which has no antibiotic properties. Cycloserine has been used orally only to a limited extent with animals because it deteriorates when incorporated in an animal feed. The reason for deterioration is not well understood but perhaps it occurs because there is usually sufficient moisture present to cause dimerization.

It has long been known that cycloserine does not form the dimer in alkaline solution. However alkaline solutions are not palatable to animals, so alkaline cycloserine solutions have not heretofore been used in animal nutrition or veterinary medicine.

SUMMARY OF THE INVENTION

It is an object of this invention to provide a method of administering cycloserine to animals.

It is another object of this invention to provide a method of administering cycloserine to animals by their drinking water.

Other objects will be apparent to those skilled in the art from the disclosure herein.

It is the discovery of this invention to provide a method of administering cycloserine to an animal for prophylactic or therapeutic purposes by the steps of:
a. forming a concentrated aqueous solution of cycloserine at a pH within the range of 8–10, and
b. delivering said concentrated cycloserine solution into the drinking water of said animal at a rate sufficient to provide an effective dosage of cycloserine.

DETAILED DISCUSSION

The concentrated cycloserine solution employed in the practice of this invention is preferably at a pH within the range of 8–10. The alkalinity can be provided by potassium or, preferably, sodium hydroxide; or by sodium or potassium carbonate. The alkali hydroxide or carbonate is preferably present at a ratio of about 0.7 equivalents to about one equivalent of cycloserine (mol.wt. 101). The alkali hydroxide should be free from any deleterious substance.

For the practice of this invention, the concentration of cycloserine in solution is not absolutely critical in that, it should not be so high as to present solubility problems at low temperatures, nor so low as to present problems in delivering the solution into the drinking water. A concentration of 20–25 g/100 ml is a convenient concentration, but a solution as dilute as 10 g/100 ml can also be used advantageously.

The amount of concentrated cycloserine to be delivered to the drinking water is selected consistent with the animal species, the disease process for which the animal is to be treated, and amount of water the animal is expected to consume. Generally a concentration of 0.1 mg/ml to 10 mg/ml will be sufficient for most occasions, while 0.5 to 5 mg/ml will more often be encountered. The determination of the amount to be delivered is well within the ability of those skilled in the art without the necessity of undue experimentation.

Automatic watering devices for animals are well known, and automatic metering devices for metering a fluid into the water supply line are also well known. This invention can be generally practiced with most, if not all, such devices available. The concentrated solution should be metered into the drinking water in a proportion sufficient to provide a concentration of about 0.1–10 mg/ml. At this dilution, the alkalinity is of no physiological significance to the animal.

The practice of this invention is not limited to automatic metering, however; any method of delivering the concentrated solution to the drinking water will be found suitable. For example, where a water reservoir is filled periodically, a suitable amount of cycloserine can be added at the time of filling. Another suitable method is to deliver the cycloserine by gravity feed from an elevated tank. Many such methods will be apparent to those skilled in the art.

This invention is particularly useful for providing prophylactic measures for poultry and pregnant sows. At parturition and immediately thereafter, sows are very susceptible to metritis-mastitis-agalactia (MMA) and the oral administration of cycloserine greatly assists the sow's natural defenses. Poultry, especially chickens and turkeys, are highly susceptible to epidemic diseases which may result in the loss of whole flocks. Many of the organisms causing these diseases are susceptible to cycloserine, as is known, so the prophylactic oral administration of the antibiotic in the drinking water can be very effective in preventing such diseases.

The invention will be better understood with reference to the following examples. It is understood, however, that the examples are intended for illustration only and it is not intended that the invention be limited thereby.

EXAMPLE 1

A solution of 4.04 g (0.101 equiv.) of sodium hydroxide was dissolved in sufficient water to make 40 ml, and 15.25 g of a 1:1 by wt. mixture of cycloserine and O-carbamyl - D-serine (OCS) was then dissolved therein to provide 0.67 equivalents of NaOH per equivalent of cycloserine and 0.97 equivalents of NaOH per equivalent of OCS. The initial pH was 9.7 which dropped to 9.5 upon standing accompanied by the odor of ammonia indicating the decomposition of the OCS. The pH again was adjusted to 9.7 with aqueous sodium hydroxide solution.

A solution prepared as above is delivered into the drinking water provided to pregnant sows at a concentration of about 1.5 mg of cycloserine per milliliter of water under conditions where it is anticipated that the sows will consume about 0.5 gallon of water per day per sow. The cycloserine is administered as a prophylactic measure against the development of MMA after the birth of a litter. Consumption of 2,000 ml of treated water per day by a sow supplies the required dose of 3 g/day in treatment of MMA.

EXAMPLE 2

A solution was prepared by dissolving 7.5 g cycloserine (0.075 equiv.) and 2.3 g of sodium hydroxide (0.0575) in 40 ml of water. The pH was 8.2. It was adjusted to 8.9 with a 50% sodium hydroxide solution. It was then stored for four weeks at room temperature and was periodically assayed by known methods, viz:

| | |
|---|---|
| 1st day | 126 mg/ml |
| | 145 |
| 5th day | 163 |
| 6th day | 165 |
| | 117 |
| 28th day | 148 |

The solution was judged to be stable for at least 4 weeks.

EXAMPLE 3

A solution prepared according to example 2 is metered into the drinking water provided to poultry to provide prophylactic protection from disease organisms susceptible to cycloserine.

EXAMPLE 4

The experiment of example 3 is repeated in all essential details except that potassium hydroxide is substituted for sodium hydroxide in equi-molar proportions. The resulting solution is stable and is suitable for administration to animals in their drinking water.

EXAMPLE 5

The experiment of example 2 is repeated in all essential details except that sodium carbonate is substituted for sodium hydroxide on an equivalent weight basis. The resulting solution is stable and suitable for delivering into the drinking water provided for animals.

EXAMPLE 6

The experiment of example 2 is repeated in all essential details except that potassium carbonate is substituted for sodium hydroxide on an equivalent weight basis. The resulting solution is stable and suitable for delivering into the drinking water provided for animals.

We claim:
1. A method of administering cycloserine to an animal for prophylactic or therapeutic purposes comprising the steps of
   a. forming a concentrated aqueous solution of cycloserine at about 10 to about 25 g/100 ml of solution at a pH within the range of 8–10, and
   b. delivering said concentrated cycloserine solution into the drinking water of said animal at a rate sufficient to provide a concentration of 0.1–10 mg/ml, thereby providing an effective dosage of cycloserine for said animal.
2. The method of claim 1 wherein said pH is provided by sodium or potassium hydroxide at a proportion of about 0.7 to 1.0 equivalents per equivalent of cycloserine.
3. The method of claim 1 wherein said pH is provided by sodium or potassium carbonate.

* * * * *